(12) United States Patent
Hu

(10) Patent No.: US 9,946,075 B1
(45) Date of Patent: Apr. 17, 2018

(54) SEE-THROUGH DISPLAY GLASSES FOR VIRTUAL REALITY AND AUGMENTED REALITY APPLICATIONS

(71) Applicant: Darwin Hu, San Jose, CA (US)

(72) Inventor: Darwin Hu, San Jose, CA (US)

(73) Assignee: Darwin Hu

( * ) Notice: Subject to any disclaimer, the term of this patent is extended or adjusted under 35 U.S.C. 154(b) by 0 days.

(21) Appl. No.: 15/372,957

(22) Filed: Dec. 8, 2016

(51) Int. Cl.
| G02B 27/01 | (2006.01) |
| F21V 8/00 | (2006.01) |
| G02B 27/00 | (2006.01) |
| G06F 3/01 | (2006.01) |

(52) U.S. Cl.
CPC ....... *G02B 27/0172* (2013.01); *G02B 6/0006* (2013.01); *G02B 6/0008* (2013.01); *G02B 27/0093* (2013.01); *G06F 3/013* (2013.01); *G02B 2027/011* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| 6,053,936 | A | * | 4/2000 | Koyama | A61M 21/00 600/27 |
| 2015/0205126 | A1 | * | 7/2015 | Schowengerdt | G06T 7/73 345/633 |
| 2015/0234477 | A1 | * | 8/2015 | Abovitz | G06K 9/00671 382/103 |
| 2016/0033771 | A1 | * | 2/2016 | Tremblay | G02B 27/0172 345/8 |
| 2016/0041354 | A1 | * | 2/2016 | Guenter | G02B 6/4432 385/86 |
| 2016/0270656 | A1 | * | 9/2016 | Samec | A61B 3/085 |
| 2017/0097507 | A1 | * | 4/2017 | Yeoh | G02B 6/0026 |

* cited by examiner

*Primary Examiner* — Jennifer Mehmood
*Assistant Examiner* — Krishna Neupane
(74) *Attorney, Agent, or Firm* — Joe Zheng

(57) ABSTRACT

Architecture and designs of wearable devices for virtual reality and augmented reality applications are described. According to one aspect of the present invention, a display device is made in form of a pair of glasses and includes a minimum number of parts to reduce the complexity and weight thereof. A separate enclosure is provided as portable to be affixed or attached to a user (e.g., a pocket or waist belt). The enclosure includes all necessary parts and circuits to generate content for virtual reality and/or augmented reality applications. The content is optically picked up by an optical cable and transported by one or more optical fibers in the optical cable to the glasses, where the content is projected respectively to the lenses specially made for displaying the content before the eyes of the wearer.

20 Claims, 14 Drawing Sheets

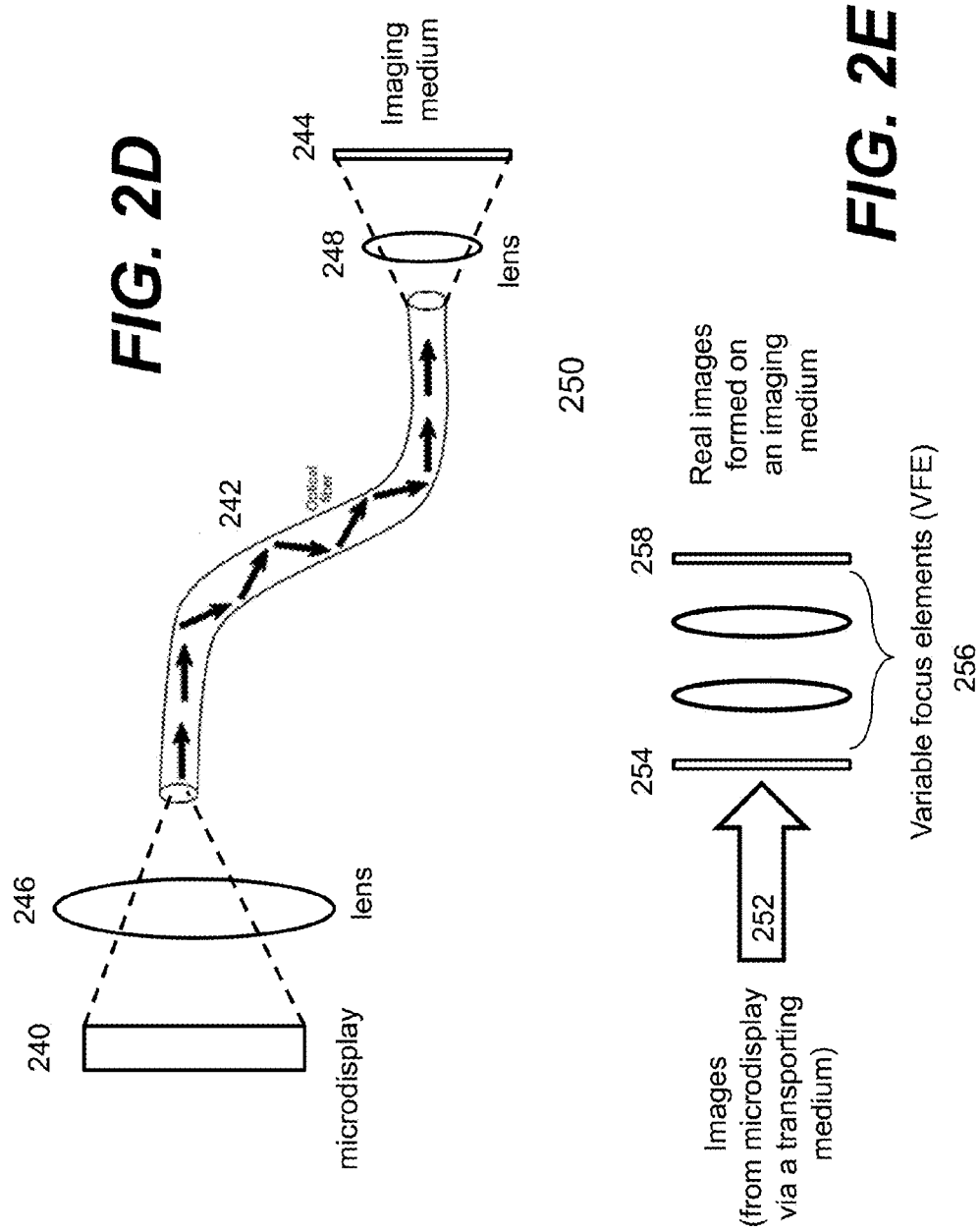

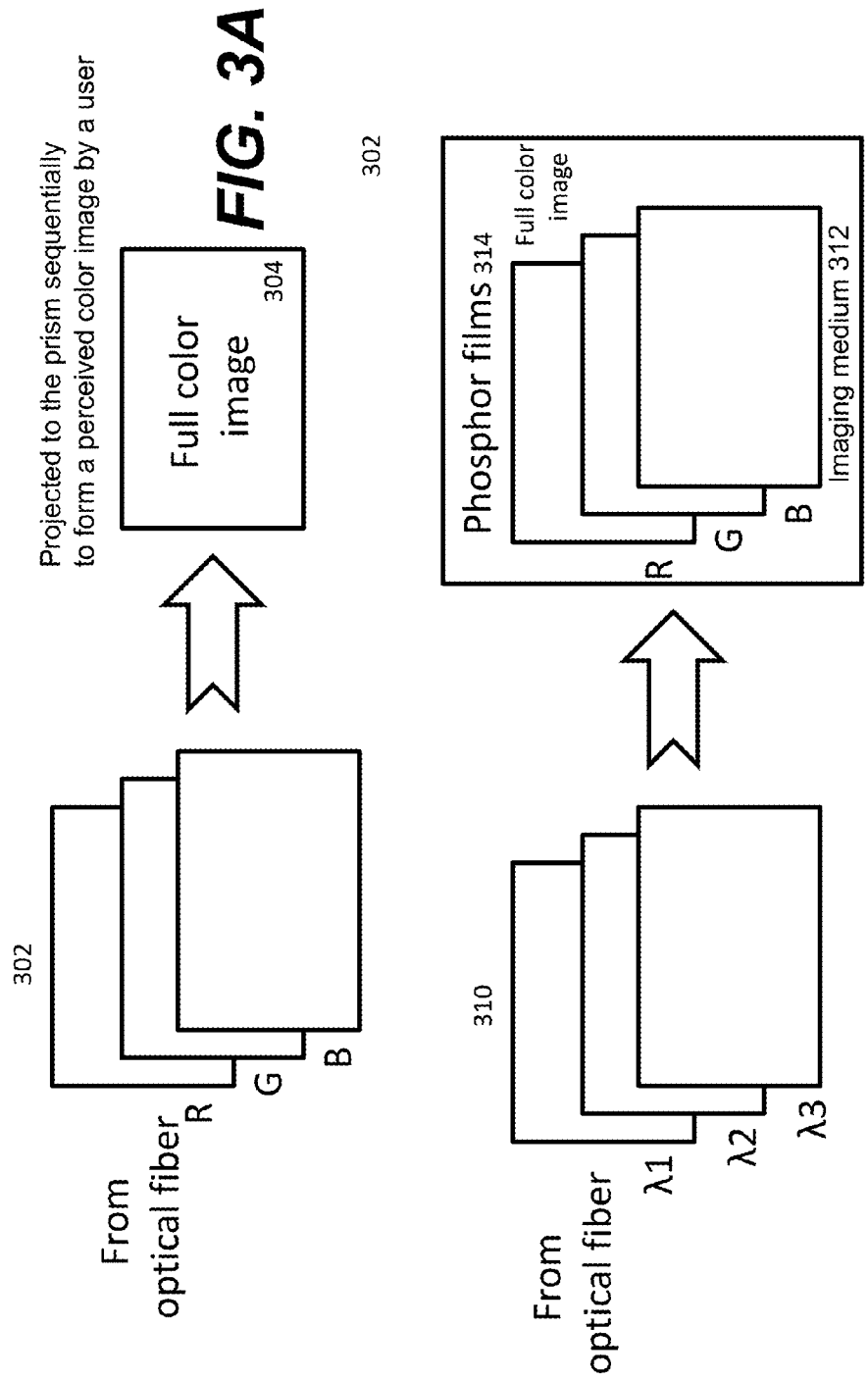

SEE-THROUGH DISPLAY GLASSES FOR VIRTUAL REALITY AND AUGMENTED REALITY APPLICATIONS

BACKGROUND OF THE INVENTION

Field of the Invention

The present invention generally relates to the area of display devices and more particularly relates to architecture and designs of display devices, where a display device is made in form of a pair of glasses, and may be used in various applications including virtual reality and augmented reality.

Description of the Related Art

Virtual Reality or VR is generally defined as a realistic and immersive simulation of a three-dimensional environment created using interactive software and hardware, and experienced or controlled by movement of the body. A person using virtual reality equipment is typically able to look around the artificially generated three-dimensional environment, moves around in it and interacts with features or items that are depicted on a screen or in goggles. Virtual realities artificially create sensory experiences, which can include sight, touch, hearing, and, less commonly, smell.

Augmented reality (AR) is a technology that layers computer-generated enhancements atop an existing reality in order to make it more meaningful through the ability to interact with it. AR is developed into apps and used on mobile devices to blend digital components into the real world in such a way that they enhance one another, but can also be told apart easily. AR technology is quickly coming into the mainstream. It is used to display score overlays on telecasted sports games and pop out 3D emails, photos or text messages on mobile devices. Leaders of the tech industry are also using AR to do amazing and revolutionary things with holograms and motion activated commands.

The delivery methods of Virtual Reality and Augmented Reality are different when viewed separately. Most 2016-era virtual realities are displayed either on a computer monitor, a projector screen, or with a virtual reality headset (also called head-mounted display or HMD). HMDs typically take the form of head-mounted goggles with a screen in front of the eyes. Virtual Reality actually brings the user into the digital world by cutting off outside stimuli. In this way user is solely focusing on the digital content being displayed in the HMDs. Augmented reality is being used more and more in mobile devices such as laptops, smart phones, and tablets to change how the real world and digital images, graphics intersect and interact.

In reality, it is not always VR vs. AR as they do not always operate independently of one another, and in fact are often blended together to generate an even more immersing experience. For example, haptic feedback, which is the vibration and sensation added to interaction with graphics, is considered an augmentation. However, it is commonly used within a virtual reality setting in order to make the experience more lifelike though touch.

Virtual reality and augmented reality are great examples of experiences and interactions fueled by the desire to become immersed in a simulated land for entertainment and play, or to add a new dimension of interaction between digital devices and the real world. Alone or blended together, they are undoubtedly opening up worlds, both real and virtual alike.

FIG. 1A shows an exemplary goggle now commonly seen in the market for the application of delivering or displaying VR or AR. No matter how a goggle is designed, it appears bulky and heavy, and causes inconvenience when worn on a user. Further most of the goggles cannot be seen through. In other words, when a user wears a goggle, he or she would not be able to see or do anything else. Thus, there is a need for an apparatus that can display the VR and AR but also allows a user to perform other tasks if needed.

Various wearable devices for VR/AR and holographic applications are being developed. FIG. 1B shows a sketch of HoloLens from Microsoft. It weights 579 g (1.2 lbs). With the weight, a wearer won't feel comfortable when wearing it for a period. Indeed, what is available in the market is generally heavy and bulky in comparison to normal glasses. Thus there is a further need for a wearable AR/VR viewing or display device that looks similar to a pair of regular glasses but is also amenable to smaller footprint, enhanced impact performance, lower cost packaging, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to architecture and designs of wearable devices for virtual reality and augmented reality applications. According to one aspect of the present invention, a display device is made in form of a pair of glasses and includes a minimum number of parts to reduce the complexity and weight thereof. A separate case or enclosure is provided as portable to be affixed or attached to a user (e.g., a pocket or waist belt). The enclosure includes all necessary parts and circuits to generate content for virtual reality and augmented reality applications, resulting in a minimum number of parts needed on the glasses, hence smaller footprint, enhanced impact performance, lower cost packaging, and easier manufacturing process of the glasses. The content is optically picked up by an optical cable and transported by optical fibers in the optical cable to the glasses, where the content is projected respectively to the lenses specially made for displaying the content before the eyes of the wearer.

According to another aspect of the present invention, the glasses (i.e., the lenses therein) and the enclosure are coupled by an optical cable including at least one optical fiber, where the fiber is responsible for transporting the content or an optical image from one end of the optical fiber to another end thereof by total internal reflections within the fiber. The optical image is picked up by a focal lens from a microdisplay in the enclosure.

According to still another aspect of the present invention, each of the lenses includes a prism in a form that propagates an optical image being projected onto one edge of the prism to an optical path that a user can see the optical image. The prism is also integrated with or stacked on an optical correcting lens that is complementary or reciprocal to that of the prism to form an integrated lens for the glasses. The optical correcting lens is provided to correct an optical path from the prism to allow the user to see through the integrated lens without optical distortions.

According to still another aspect of the present invention, each of the lenses includes an optical waveguide that propagates an optical image being projected onto one end of the waveguide to another end with an optical path that a user can see the optical image. The waveguide may also be integrated with or stacked on an optical correcting lens to form an integrated lens for the glasses.

According to still another aspect of the present invention, the integrated lens may be further coated with one for more films with optical characteristics that amplify the optical image before the eyes of the user.

According to still another aspect of the present invention, the glasses include a few electronic devices (e.g., sensor or microphone) to enable various interactions between the wearer and the displayed content. Signals captured by a device (e.g., a depth sensor) are transmitted to the enclosure via wireless means (e.g., RF or Bluetooth) to eliminate the wired connections between the glasses and the enclosure.

According to still another aspect of the present invention, instead of using two optical cables to transport the images from two microdisplays, a single optical cable is used to transport the images from one microdisplay. The optical cable may go through either one of the temples of the glasses. A splitting mechanism disposed near or right on the bridge of the glasses is used to split the images into two versions, one for the left lens and the other for the right lens. These two images are then respectively projected into the prisms or waveguides that may be used in the two lenses.

According to yet another aspect of the present invention, the optical cable is enclosed within or attached to functional multi-layer structures which form a portion of an article of clothing. When a user wears a shirt made or designed in accordance with one of the embodiment, the cable itself has less weight while the user can have more activities.

The present invention may be implemented as an apparatus, a method, a part of system. Different implementations may yield different benefits, objects and advantages. In one embodiment, the present invention is a pair of glasses comprising: at least a lens, a pair of temples, and a projection mechanism, disposed near an end of the temple, receiving an optical image from the temple and projecting the optical image into the lens. At least one temple includes an optical cable, wherein the optical cable is extended beyond the temple to receive the optical image optically picked up by a focal lens that projects the optical image onto one end of an optical cable. The optical cable includes at least one optical fiber to transport the optical image from one end of the optical cable to another end of the optical cable by total internal reflection in the optical fiber, and the optical image is projected onto the optical fiber by a focal lens from a displayed image on a microdisplay.

In another embodiment, the present invention is a display apparatus comprising: at least a lens, a pair of temples, at least one temple including an optical cable, wherein the optical cable is extended beyond the temple to receive an optical image, a projection mechanism, disposed near an end of the temple, receiving the optical image from the temple and projecting the optical image into the lens, and a sensor and an infrared lighting source disposed separately around the lens to image an eye looking at the optical image, wherein the eye being illuminated by the infrared lighting source. The projection mechanism includes a focal mechanism auto-focusing and projecting the optical image onto the first edge of the prism. The display apparatus further includes a wireless module provided to transmit wirelessly a sensing signal from the sensor to a case including a processor and circuitry to process the sensing signal and send a feedback signal to control the focal mechanism.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2D shows how an image is being transported from a microdisplay via a fiber cable to an imaging medium;

FIG. 2E shows a set of exemplary variable focus elements (VFE) to accommodate an adjustment of the projection of an image onto an optical object (e.g., an imaging medium or a prism);

FIG. 2I shows a shirt in which an optical cable is enclosed within the shirt or attached thereto;

FIG. 3A shows how three single color images are being combined visually and perceived as a full color image by human vision;

FIG. 3B shows that three different color images are generated under three lights respectively at wavelengths λ1, λ2, and λ3, the imaging medium includes three films, each coated with a type of phosphor.

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 2A-6B. However, those skilled in the art will readily appreciate that the detailed description given herein with respect to these figures is for explanatory purposes as the invention extends beyond these limited embodiments.

Figure 1A:
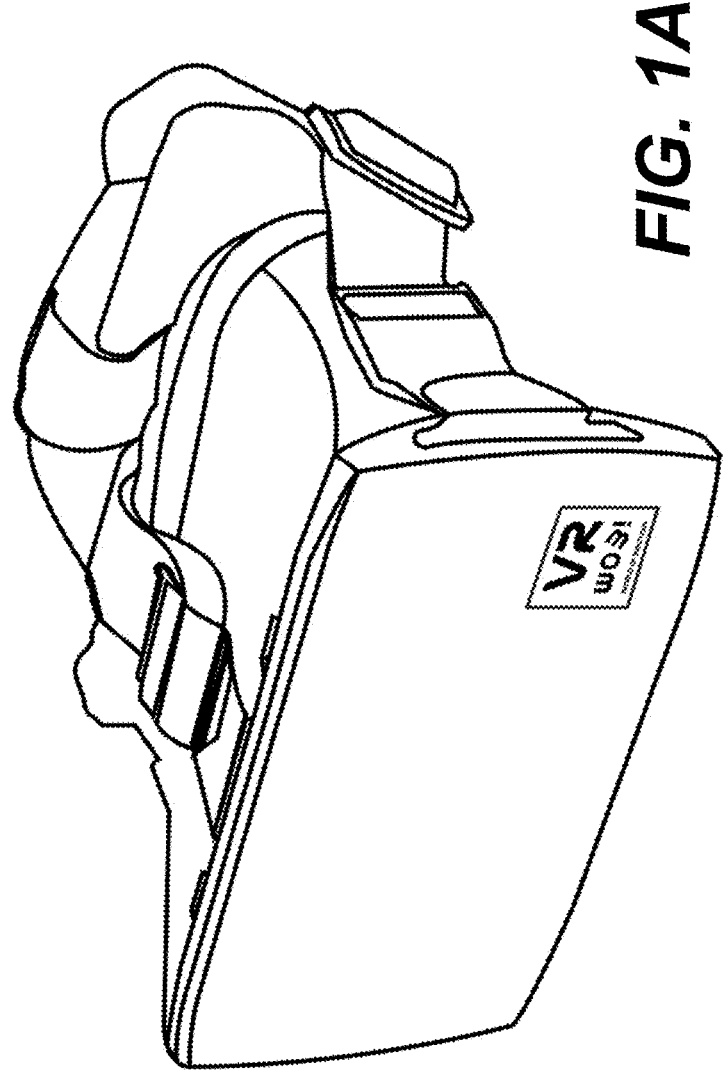
FIG. 1A shows an exemplary goggle now commonly seen in the market for the application of delivering or displaying VR or AR.
Figure 1B:
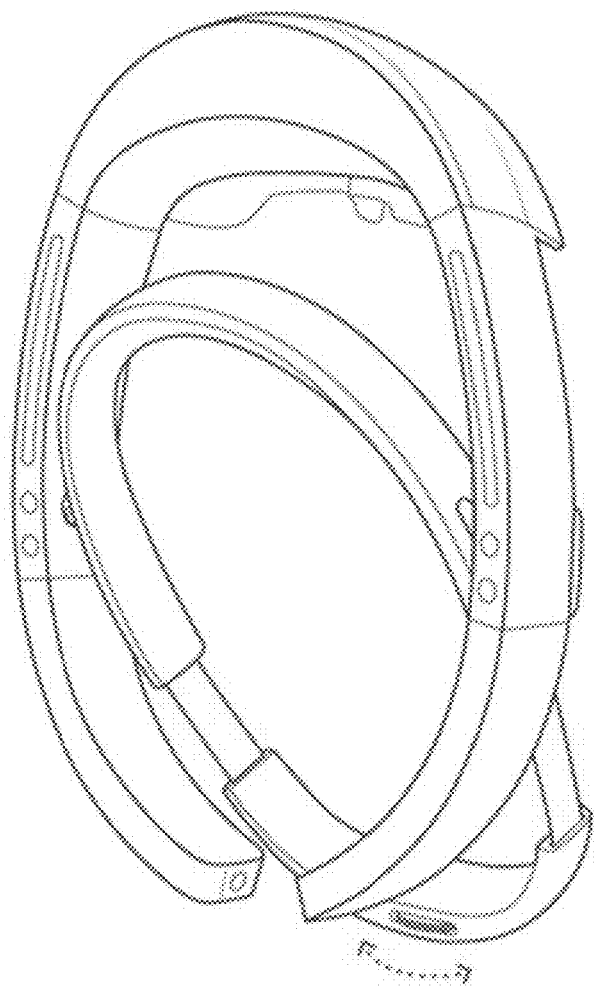
FIG. 1B shows a sketch of HoloLens from Microsoft.
Figure 2A:
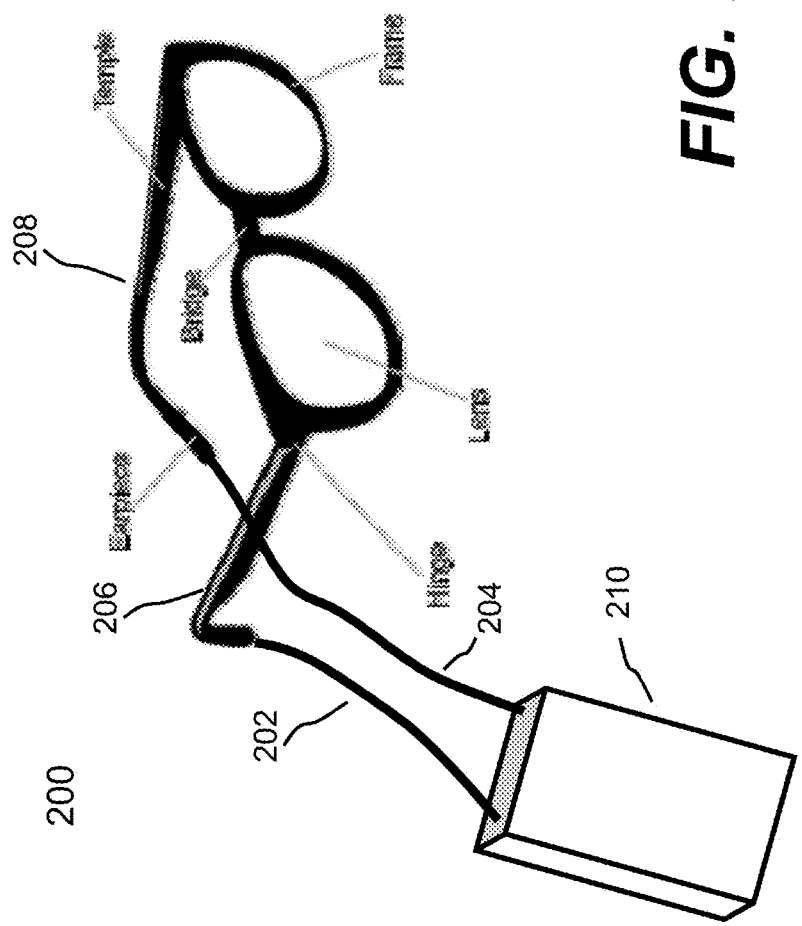
FIG. 2A shows a pair of exemplary glasses that can be used for the application of VR according to one embodiment of the present invention.

Referring now to the drawings, in which like numerals refer to like parts throughout the several views. FIG. 2A shows a pair of exemplary glasses 200 that are used for applications of VR/AR according to one embodiment of the present invention. The glasses 200 appear no significant difference to a pair of normal glasses but include two flexible cables 202 and 204 that are respectively extended from the temples 206 and 208. According to one embodiment, each pair of the two flexible cables 202 and the temples 206 and 208 are integrated or removably connected at one end thereof and include one or more optical fibers.

Both of flexible cables 202 are coupled at another end thereof to a portable computing device 210, where the computing device 210 generates images based on a microdisplay that are captured by the cables 202. The images are transported through the optical fibers in the flexible cables 202 by the total internal reflections therein all the way to another end of the optical fibers, where the images are projected onto the lenses in the glasses 200.

Figure 2B:
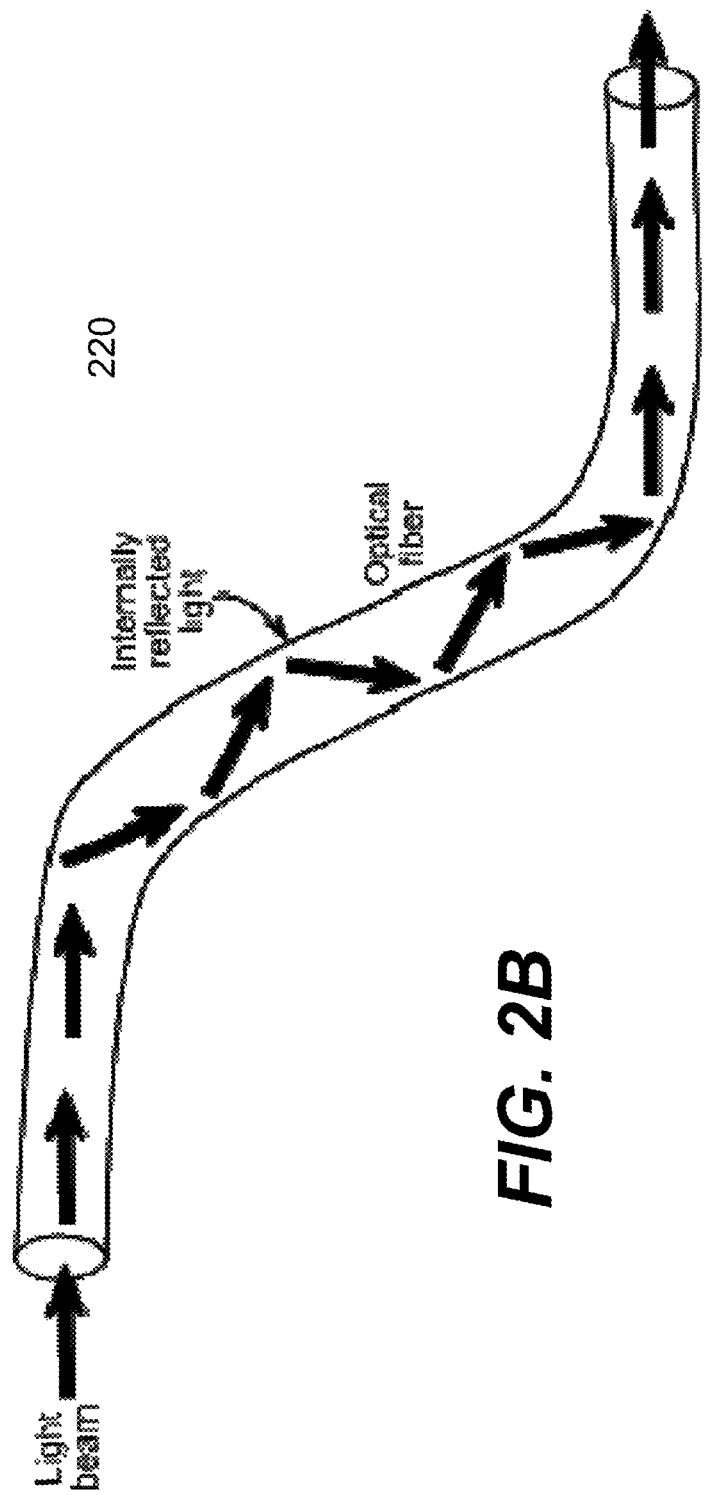
FIG. 2B illustrates that an optical fiber is used to transmit light from one place to the other along curved path in a more effective manner or by total internal reflections within the fiber.

According to one embodiment, each of the two flexible cables 202 includes one or more optical fibers. Optical fibers are used to transmit light from one place to the other along curved path in a more effective manner as shown in FIG. 2B. In one embodiment, the optical fibers are formed with thousands of strands of a very fine quality glass or quartz of refractive index about 1.7 or so. The thickness of a strand is tine. The strands are coated with a layer of some material of lower refractive index. The ends of the strands are polished and clamped firmly after aligning them carefully. When light is incident at a small angle at one end, it gets refracted into the strands (or fibers) and gets incident on the interface of the fibers and the coating. The angle of incidence being greater than the critical angle, the ray of light undergoes total internal reflections and essentially transports the light from one end to another end even if the fiber is bent. Depending on the implementation of the present invention, a single fiber or a plurality of fibers arranged in parallel may be used to transport an optical image projected onto one end of the fiber or fibers to another end thereof.

Figure 2C:
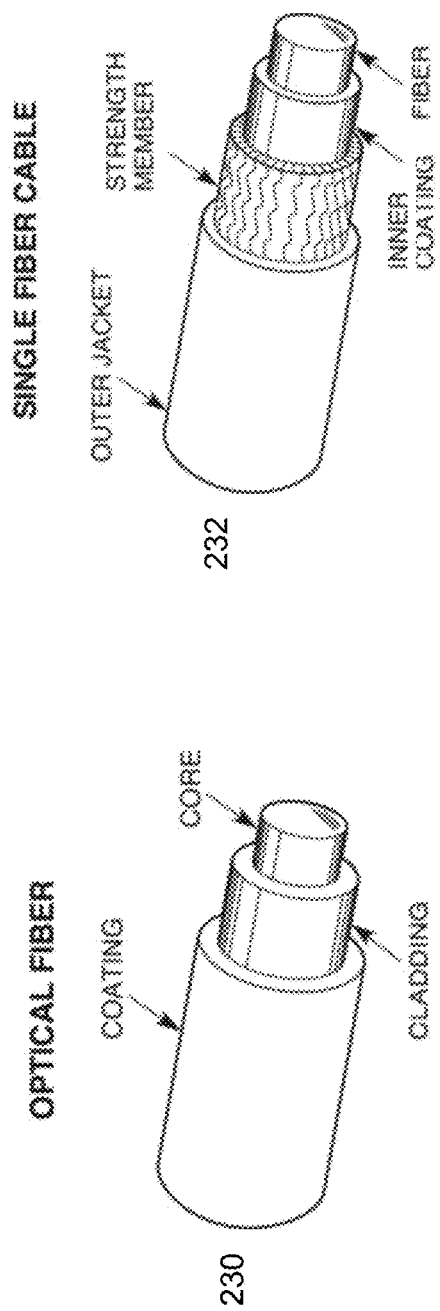
FIG. 2C shows two exemplary ways to encapsulate a fiber or a plurality of fibers according to one embodiment of the present invention.

FIG. 2C shows two exemplary ways to encapsulate a fiber or a plurality of fibers according to one embodiment of the present invention. The encapsulated fiber or fibers may be used as the cable 202 or 204 in FIG. 2A and extended through each of the non-flexible temples 206 and 208 all the way to the end thereof. According to one embodiment, the temples 206 and 208 are made of a type of material (e.g., plastic or metal) commonly seen in a pair of regular glasses, a portion of the cable 202 or 204 is embedded or integrated in the temple 206 or 208, resulting in a non-flexible part while another portion of the cable 202 or 204 remains flexible. According to another embodiment, the non-flexible part and the flexible part of the cable 202 or 204 may be removably connected via a type of interface or connector.

Referring now to FIG. 2D, it shows how an image is being transported from a microdisplay 240 via a fiber cable 242 to an imaging medium 244. As will be further described below, an imaging medium 244 may be a physical thing (e.g., films) or non-physical thing (e.g., the air). A microdisplay is a display that has a very small screen (e.g., less than an inch). This type of tiny electronic display system was introduced commercially in the late 1990s. The most common applications of microdisplays include rear-projection TVs and head-mounted displays. Microdisplays may be reflective or transmissive depending upon the way light is allowed to pass through the display unit. Through a lens 246, an image (not shown) displayed on the microdisplay 240 is picked up by one end of the fiber cable 242 that transports the image to the other end of the fiber cable 242. Another lens 248 is provided to collect the image from the fiber cable 242 and projects it to the imaging medium 244. Depending on the implementation, there are different types of microdisplays and imaging mediums. Some of the embodiments of the microdisplays and imaging mediums will be described in detail below.

FIG. 2E shows a set of exemplary variable focus elements (VFE) 250 to accommodate an adjustment of the projection of an image onto an optical object (e.g., an imaging medium or a prism). To facilitate the description of various embodiments of the present invention, it is assumed that there is an image medium. As illustrated in FIG. 2E, an image 252 transported by a fiber cable reaches the end surface 254 of the fiber cable. The image 252 is focused by a set of lens 256, referred to herein as variable focus elements (VFE), onto an imaging medium 258. The VFE 256 is provided to be adjusted to make sure that the image 252 is precisely focused onto the imaging medium 258. Depending the implementation, the adjustment of the VFE 256 may be done manually or automatically in accordance with an input (e.g., a measurement obtained from a sensor). According to one embodiment, the adjustment of the VFE 256 is performed automatically in accordance with a feedback signal derived from a sensing signal from a sensor looking at an eye (pupil) of the wearer wearing the glasses 200 of FIG. 2A.

Figure 2F:
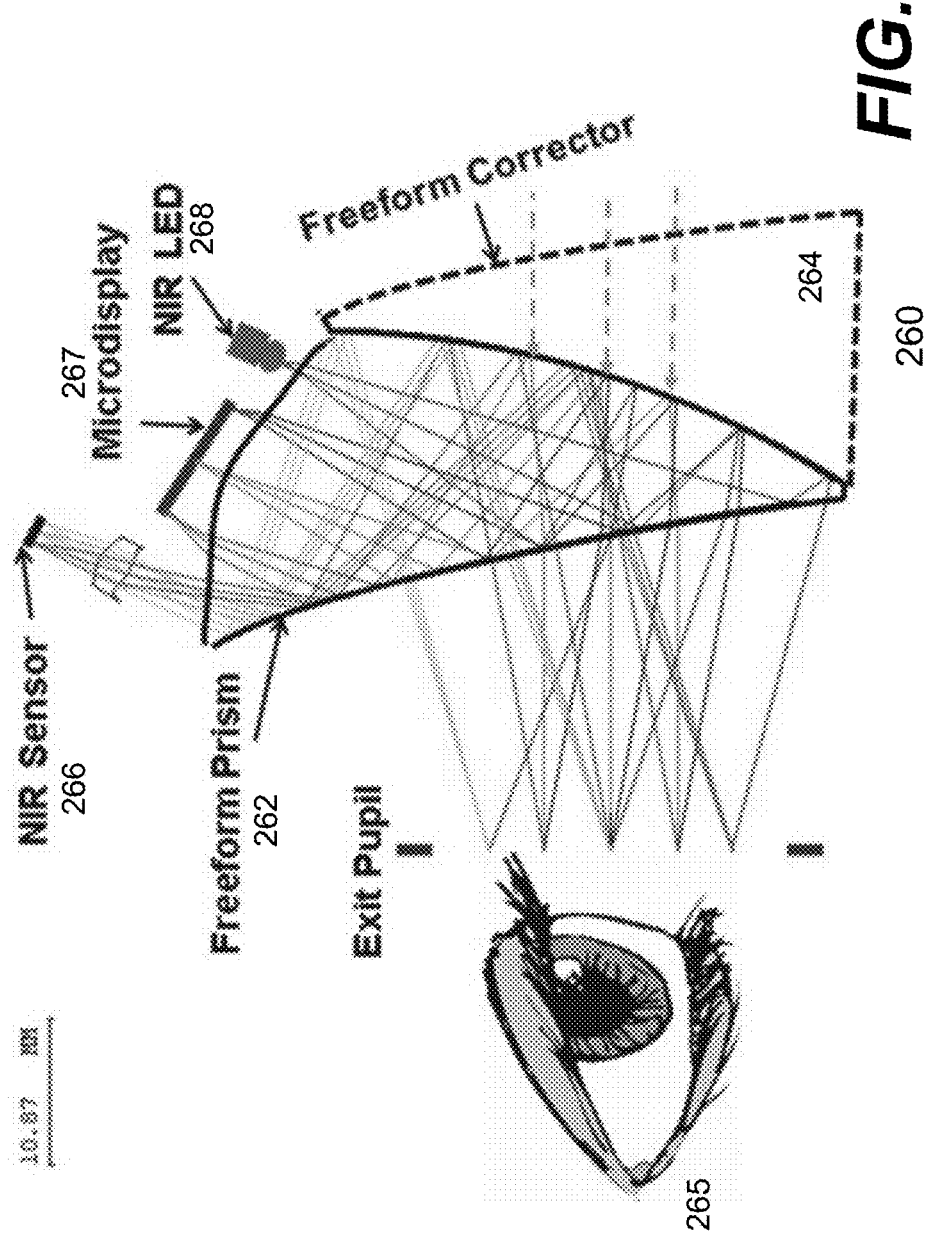
FIG. 2F shows an exemplary lens that may be used in the glasses shown in FIG. 2A, where the lens includes two parts, a prism and an optical correcting lens or corrector.

Referring now to FIG. 2F, it shows an exemplary lens 260 that may be used in the glasses shown in FIG. 2A. The lens 260 includes two parts, a prism 262 and an optical correcting lens or corrector 264. The prism 262 and the corrector 264 are stacked to form the lens 260. As the name suggests, the optical corrector 264 is provided to correct the optical path from the prism 262 so that a light going through the prism 262 goes straight through the corrector 264. In other words, the refracted light from the prism 262 is corrected or de-refracted by the corrector 264. In optics, a prism is a transparent optical element with flat, polished surfaces that refract light. At least two of the flat surfaces must have an angle between them. The exact angles between the surfaces depend on the application. The traditional geometrical shape is that of a triangular prism with a triangular base and rectangular sides, and in colloquial use a prism usually refers to this type. Prisms can be made from any material that is transparent to the wavelengths for which they are designed. Typical materials include glass, plastic and fluorite. According to one embodiment, the type of the prism 262 is not in fact in the shape of geometric prisms, hence the prism 262 is referred herein as a freeform prism, which leads to the corrector 264 to a form complementary, reciprocal or conjugate to that of the prism 262 to form the lens 260.

On one edge of the lens 260 or the edge of the prism 262, there are at least three items utilizing the prism 262. Referenced by 267 is an imaging medium corresponding to the imaging medium 244 of FIG. 2D or 258 of FIG. 2E. Depending on the implementation, the image transported by the optical fiber 242 of FIG. 2D may be projected directly onto the edge of the prism 262 or formed on the imaging medium 267 before it is projected onto the edge of the prism 262. In any case, the projected image is refracted in the prism 262 and subsequently seen by the eye 265 in accordance with the shapes of the prism 262. In other words, a user wearing a pair of glasses employing the lens 262 can see the image being displayed through or in the prism 262.

A sensor 266 is provided to image the position or movement of the pupil in the eye 265. Again, based on the refractions provided by the prism 262, the location of the pupil can be seen by the sensor 266. In operation, an image of the eye 265 is captured. The image is analyzed to derive how the pupil is looking at the image being shown through or in the lens 260. In the application of AR, the location of the pupil may be used to activate an action. Optionally, a light source 268 is provided to illuminate the eye 265 to facilitate the image capture by the sensor 266. According to one embodiment, the light source 268 uses a near inferred source as such the user or his eye 265 would not be affected by the light source 268 when it is on.

Figure 2G:
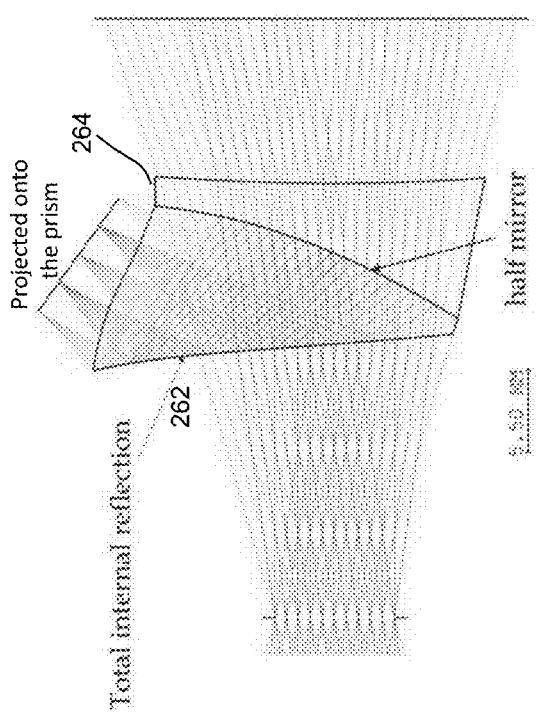
FIG. 2G shows the internal reflections from a plurality of sources (e.g., a sensor, an imaging medium and a plurality of light sources) in an irregular prism.
Figure 2H:
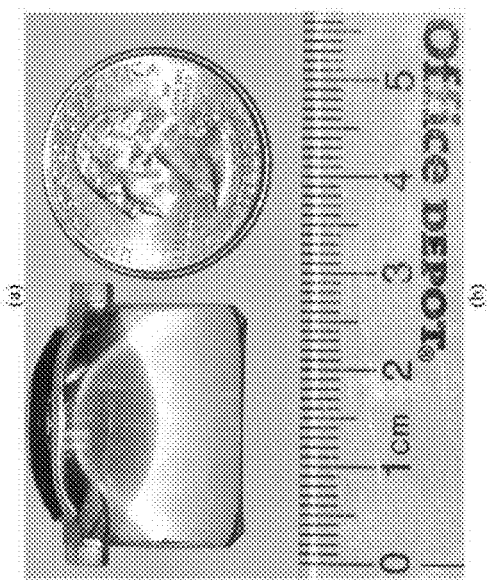
FIG. 2H shows a comparison of such an integrated lens to a coin and a ruler.
Figure 21:
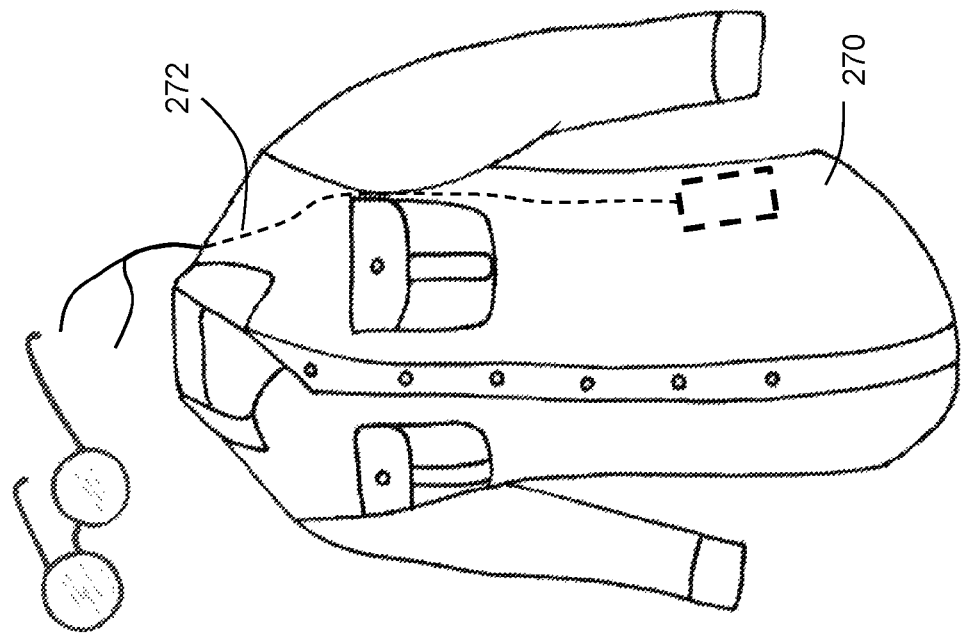

FIG. 2G shows the internal reflections from a plurality of sources (e.g., the sensor 266, the imaging medium 267 and the light source 268). As the prism is uniquely designed in particular shapes or to have particular edges, the rays from the sources are reflected several times within the prism 268 and subsequently impinge upon the eye 265. For completeness, FIG. 2H shows a comparison of such a lens to a coin and a ruler in sizes.

As described above, there are different types of microdisplays, hence different imaging mediums. The table below summarizes some of the microdisplays that may be used to facilitate the generation of an optical image that can be transported by one or more optical fibers one end to another end thereof by total internal reflection within the optical fiber(s).

| No. | Microdisplay types | Features | Notes |
|---|---|---|---|
| 1 | LCoS (LCD and OLED) | Full color image displayed on a silicon | A single image |
| 2 | LCoS + LED (RGB sequentially) LCoS + laser (visible, RGB sequentially) LCoS + laser (non-visible) | A single color image displayed at a time | Three images |
| 3 | SLM + laser (RGB sequentially) | A single optical color image | Three optical images |
| 4 | SLM + laser (non-visible) | A single non-visible color image | Need conversion |

LCoS = Liquid crystal on silicon;
LCD = Liquid crystal display;
OLED = Organic light-emitting diode;
RGB = Red, Green and Blue; and
SLM = Spatial light modulation.

In the first case shown above in the table, a full color image is actually displayed on a silicon. As shown in FIG. 2D, the full color image can be picked up by a focal lens or a set of lenses that project the full image right onto one end of the fiber. The image is transported within the fiber and picked up again by another focal lens at the other end of the fiber. As the transported image is visible and full color, the imaging medium 244 of FIG. 2D may not be physically needed. The color image can be directly projected onto one edge of the prism 262 of FIG. 2F.

In the second case shown above in the table, an LCoS is used with different light sources. In particular, there are at least three colored light sources (e.g., red, green and blue) used sequentially. In other words, a single color image is generated per one light source. The image picked up by the fiber is only a single color image. A full color image can be reproduced when all three different single color images are combined. The imaging medium 244 of FIG. 2D is provided to reproduce the full color image from the three different single color images transported respectively by the optical fiber.

FIG. 2I shows a shirt 270 in which an optical cable 272 is enclosed within the shirt 270 or attached thereto. The shirt 270 is an example of multi-layers. Such a relatively thin cable can be embedded into the multi-layers. When a user wears such a shirt made or designed in accordance with one of the embodiment, the cable itself has less weight while the user can have more activities.

FIG. 3A shows how three single color images 302 are being combined visually and perceived as a full color image 304 by human vision. According to one embodiment, three colored light sources are used, for example, red, green and blue light sources that are turned sequentially. More specifically, when a red light source is turned on, only a red image is produced as a result (e.g., from a microdisplay). The red image is then picked up optically and transported by the fiber, and subsequently projected into the prism 262 of FIG. 2F. As the green and blue lights are turned on afterwards and sequentially, the green and blue images are produced and transported respectively by the fiber, and subsequently projected into the prism 262 of FIG. 2F. It is well known that human vision possesses the ability of combining the three single color images and perceives them as a full color image. With the three single color images projected sequentially into the prism, all perfectly registered, the eye sees a full color image.

Also in the second case shown above, the light sources can be nearly invisible. According to one embodiment, the three light sources produce lights near UV band. Under such lighting, three different color images can still be produced and transported but are not very visible. Before they can be presented to the eyes or projected into the prism, they shall be converted to three primary color images that can subsequently be perceived as a full color image. According to one embodiment, the imaging medium 244 of FIG. 2D is provided. FIG. 3B shows that three different color images 310 are generated under three light sources respectively at wavelengths $\lambda 1$, $\lambda 2$, and $\lambda 3$, the imaging medium 312 includes three films 314, each coated with a type of phosphor, a substance that exhibits the phenomenon of luminescence. In one embodiment, three types of phosphor at wavelength 405 nm, 435 nm and 465 nm are used to convert the three different color images produced under the three light sources near UV band. In other words, when one such color image is projected onto a film coated with the phosphor at a wavelength 405 nm, the single color image is converted as a red image that is then focused and projected into the prism.

The same process is true with other two single color images that go through a film coated with phosphor at wavelength 435 nm or 465 nm, resulting in green and blue images. When such red, green and blue images are projected sequentially into the prism, a human vision perceives them together as a full color image.

In the third or fourth case shown above in the table, instead of using a light either in the visible spectrum or near invisible to human eyes, the light source uses a laser source. There are also visible lasers and non-visible lasers. Operating not much differently from the first and second cases, the third or fourth case uses what is called spatial light modulation (SLM) to form a full color image. A spatial light modulator is a general term describing devices that are used to modulate amplitude, phase, or polarization of light waves in space and time. In other words, SLM+laser (RGB sequentially) can produce three separate color images. When they are combined with or without the imaging medium, a full color image can be reproduced. In the case of SLM+laser (non-visible), the imaging medium shall be presented to convert the non-visible images to a full color image, in which case, appropriate films may be used as shown in FIG. 3B.

Figure 4:
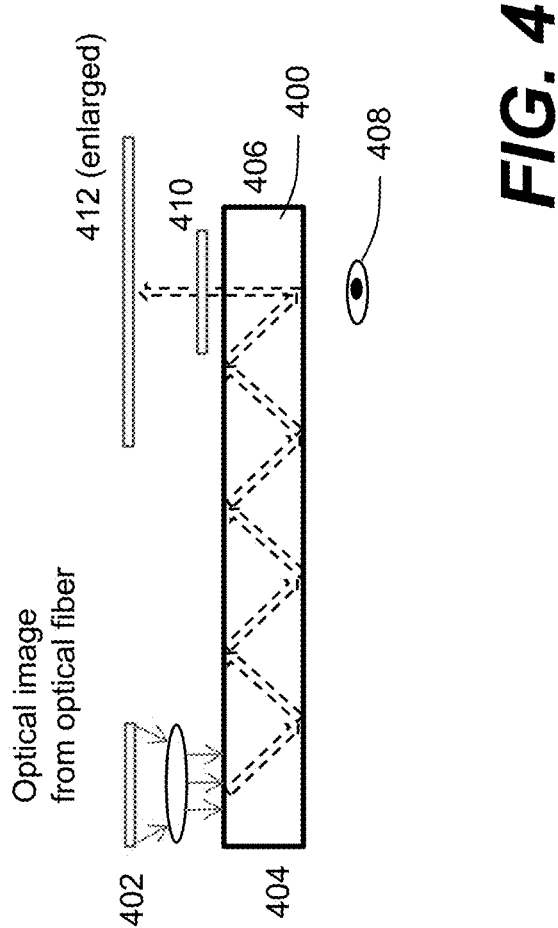
FIG. 4 shows that an waveguide is used to transport an optical image from one end of the waveguide to another end thereof.

Referring now to FIG. 4, it shows that an waveguide 400 is used to transport an optical image 402 from one end 404 of the waveguide 400 to another end 406, wherein the waveguide 400 may be stacked with one or more pieces of glass or lenses (not shown) or coated with one or more films to from a suitable lens for a pair of glasses for the applications of displaying images from a computing device. It is known to those skilled in that art that an optical waveguide is a spatially inhomogeneous structure for guiding light, i.e. for restricting the spatial region in which light can propagate, where a waveguide contains a region of increased refractive index, compared with the surrounding medium (often called cladding).

The waveguide 400 is transparent and shaped appropriately at the end of 404 to allow the image 402 to be propagated along the waveguide 400 to the end 406, where a user 408 can see through the waveguide 400 so as to see the propagated image 410. According to one embodiment, one or more films are disposed upon the waveguide 400 to amplify the propagated image 410 so that the eye 408 can see a significantly amplified image 412. One example of such films is what is called metalenses, essentially an array of thin titanium dioxide nanofins on a glass substrate.

Figure 5:
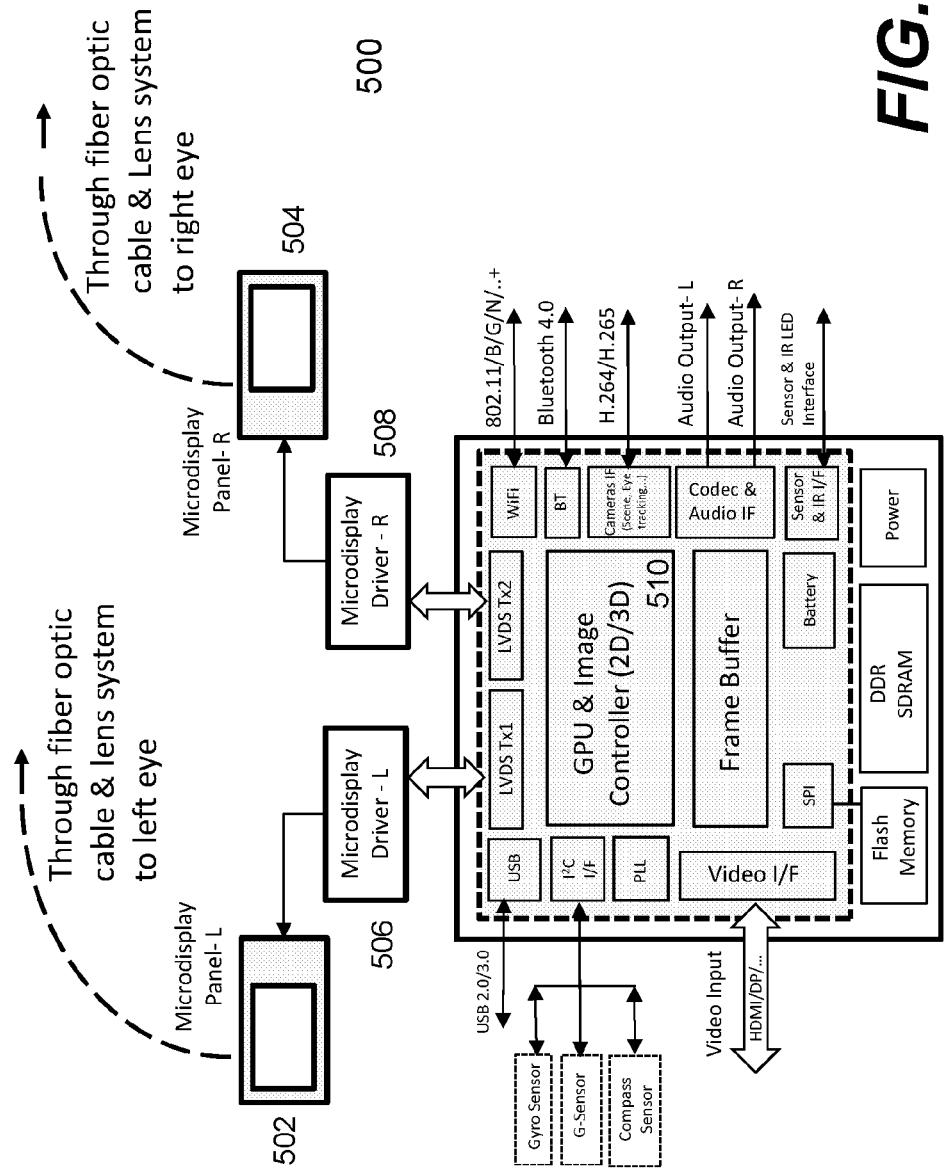
FIG. 5 shows an exemplary functional block diagram that may be used in a separate case or enclosure to produce content related to virtual reality and augmented reality for display on the exemplary glasses of FIG. 2A.

Referring now to FIG. 5, it shows an exemplary functional block diagram 500 that may be used in a separate case or enclosure to produce content related to virtual reality and augmented reality for display on the exemplary glasses of FIG. 2A. As shown in FIG. 5, there are two microdisplays 502 and 504 provided to supply content to both of lenses in the glasses of FIG. 2A, essentially a left image goes to the left lens and a right image goes to the right lens. An example of the content is 2D or 3D images and video, or hologram. Each of the microdisplays 502 and 504 is driven by a corresponding driver 506 or 508.

The entire circuit 500 is controlled and driven by a controller 510 that is programmed to generate the content. According to one embodiment, the circuit 500 is designed to communicate with the Internet (not shown), receive the content from other devices. In particular, the circuit 500 includes an interface to receive a sensing signal from a remote sensor (e.g., the sensor 266 of FIG. 2F) via a wireless means (e.g., RF or Bluetooth). The controller 510 is programmed to analyze the sensing signal and provides a feedback signal to control certain operations of the glasses, such as a projection mechanism that includes a focal mechanism auto-focusing and projecting the optical image onto an edge of the prism 262 of FIG. 2F. In addition, the audio is provided to synchronize with the content, and may be transmitted to earphones wirelessly.

FIG. 5 shows an exemplary circuit 500 to produce the content for display in a pair of glasses contemplated in one embodiment of the present invention. The circuit 500 shows that there are two microdisplays 502 and 504 used to provide two respective images or video streams to the two lenses of the glasses in FIG. 2A. According to one embodiment, only one microdisplay may be used to drive the two lenses of the glasses in FIG. 2A. Such a circuit is not provided herein as those skilled in the art know how the circuit can be designed or how to modify the circuit 500 of FIG. 5.

Figure 6A:
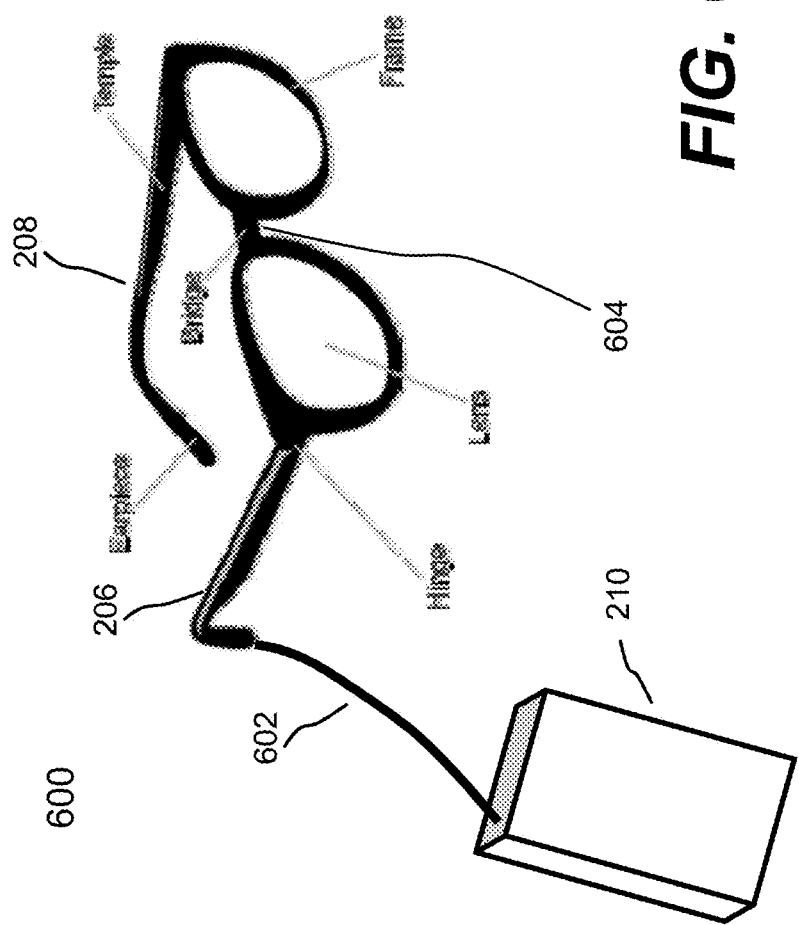
FIG. 6A shows a modified version of FIG. 2A in which a splitting mechanism is used to split an image propagated or transported by an optical cable into two parts (e.g., a left and a right image)

Given one video stream or one image, the advantage is that there is only one optical cable needed to transport the image. FIG. 6A shows a modified version 600 of FIG. 2A to show that one cable 602 is used to couple the enclosure 210 to the glasses 208. Instead of using two optical cables to transport the images from two microdisplays as shown in FIG. 2A, a single optical cable is used to transport the images from one microdisplay. The optical cable may go through either one of the temples of the glasses and perhaps further to part of one top frame. A splitting mechanism disposed near or right on the bridge of the glasses is used to split the images into two versions, one for the left lens and the other for the right lens. These two images are then respectively projected into the prisms or waveguides that may be used in the two lenses.

Figure 6B:
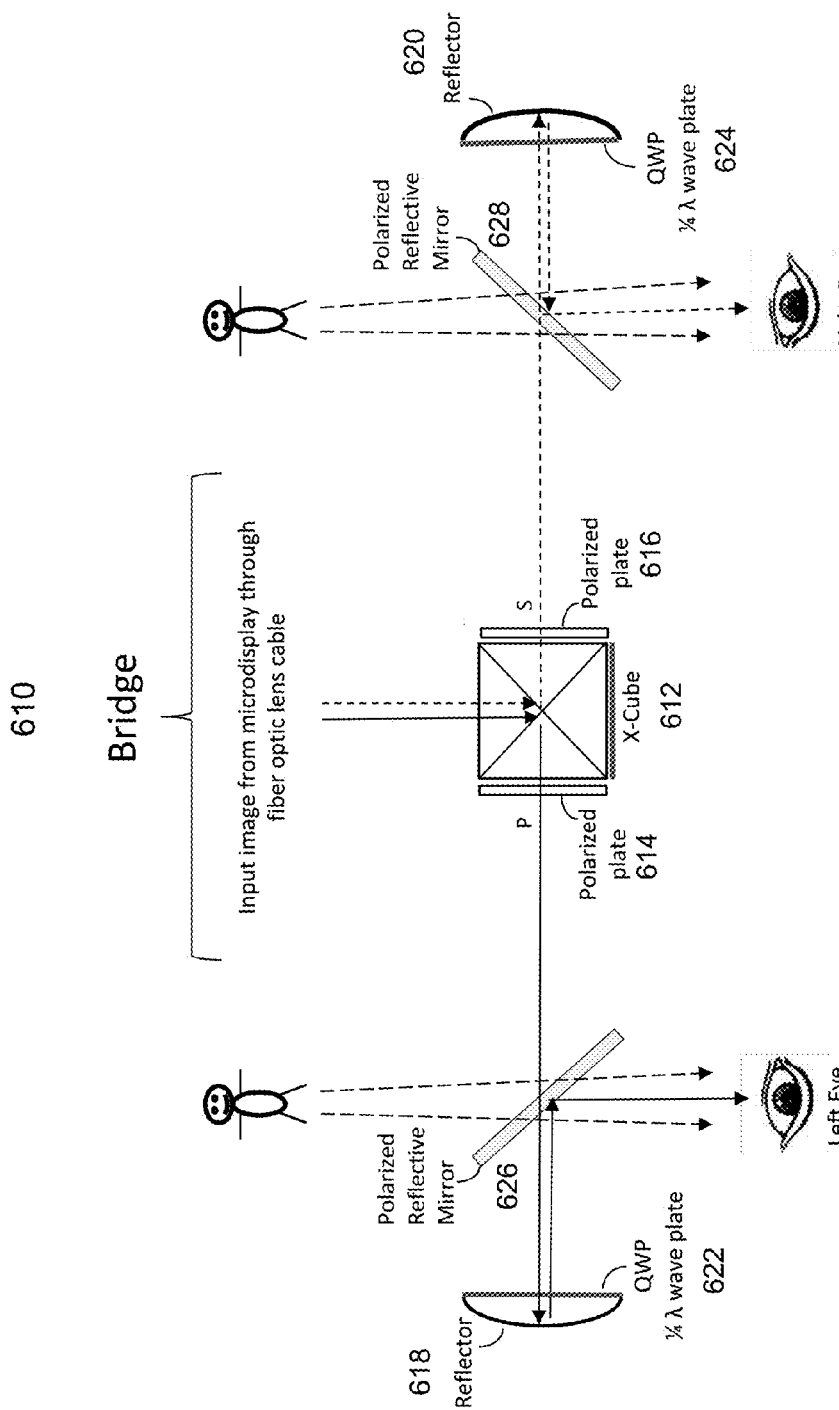
FIG. 6B shows an exemplary splitting mechanism according to one embodiment of the present invention.

To split the image propagated or transported by the cable 602, the glasses 600 are designed to include a splitting mechanism 604 that is preferably disposed near or at the bridge thereof. FIG. 6B shows an exemplary splitting mechanism 610 according to one embodiment of the present invention. A cube 612, also called X-cube beam splitter used to split incident light into two separate components, is provided to receive the image from a microdisplay via the cable 602. In other words, the image is projected onto one side of the X-cube 612. The X-cube 612 is internally coated with certain reflecting materials to split the incident image into two parts, one goes to the left and the other goes to the right as shown in FIG. 6B. A split image goes through a polarized plate 614 or 616 to hit a reflector 618 or 620 that reflects the image back to the polarized reflective mirror 626 or 628. The two polarized plates 614 and 616 are polarized differently (e.g., in horizontally and vertically or circular left and right) corresponding to the images sequentially generated either for left eye or right eye. Coated with certain reflective material, the polarized reflective mirror 626 or 628 reflects the image to the corresponding eye. Depending on the implementation, the reflected image from the polarized reflective mirror 626 or 628 may be impinged upon one edge of the prism 262 of FIG. 2F or the waveguide 400 of FIG. 4. Optionally, two wave plates 622 and 624 are respectively disposed before the reflectors 618 and 620.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A display apparatus comprising:
   at least an integrated lens formed by integrating a prism and an optical correcting lens, wherein the optical correcting lens is provided to correct a refracted optical path coming out from the prism to allow a user to see through the integrated lens without optical distortions;
   at least an optical fiber enclosed in a cable, the optical fiber having a first end and a second end;
   a pair of temples, at least one temple integrated with or coupled to the first end of the optical fiber, wherein the optical fiber is extended beyond the temple to receive a two-dimensional (2D) optical image at the second end thereof, the optical image is generated in a portable device remotely located with respect to the display apparatus, the optical fiber transports the optical image from the second end to the first end thereof by total reflection within the optical fiber, the optical image is projected onto the second end of the optical fiber by a lens from a displayed image on a microdisplay device enclosed in the portable device; and
   a projection mechanism, receiving the optical image from the first end of the optical fiber and projecting the optical image into the integrated lens, wherein the optical image is seen by a wearer wearing the display apparatus.

2. The display apparatus as recited in claim 1, wherein the optical image is a collection of light beams in varying intensities collected by the lens from the displayed image, the light beams all travel through the optical fiber simultaneously.

3. The display apparatus as recited in claim 1, further comprising another integrated lens formed by integrating a prism and an optical correcting lens to allow the user to see through the another integrated lens without optical distortions.

4. The display apparatus as recited in claim 3, wherein the optical cable transports another optical image from another displayed image, and the projection mechanism disposed near or right between the integrated lens and the another integrated lens to project respectively the optical image and the another optical image into the integrated lens and the another integrated lens for left and right eyes of the wearer.

5. The display apparatus as recited in claim 1, wherein the projection mechanism includes a focal lens focusing and projecting the optical image onto a first edge of the prism.

6. The display apparatus as recited in claim 1, wherein the projection mechanism includes a set of variable focus elements, at least one of the variable focus elements is adjustable to focus the optical image from the optical fiber onto a first edge of the prism.

7. The display apparatus as recited in claim 1, wherein the projection mechanism includes:
   an imaging medium converting the optical image from one spectrum band to another spectrum band; and
   a focal lens focusing and projecting the converted optical image onto a first edge of the prism.

8. The display apparatus as recited in claim 1, further comprising:
   an optical waveguide receiving the optical image projected onto one side of the optical waveguide and propagating the optical image to another side of the optical waveguide, the propagated optical image being seen by the wearer at the another side of the optical waveguide.

9. The display apparatus as recited in claim 1, wherein the temple is presented as inflexible while a portion of the cable that is extended beyond the temple is flexible.

10. The display apparatus as recited in claim 9, wherein the temple and the portion of the cable are removably connected.

11. The display apparatus as recited in claim 9, wherein an extended part of the portion of the cable is enclosed within or attached to functional multi-layer structures which form a portion of an article of clothing.

12. A display apparatus comprising:
   at least an integrated lens formed by integrating a prism and an optical correcting lens, wherein the optical correcting lens is provided to correct a refracted optical path coming out from the prism to allow a user to see through the integrated lens without optical distortions;
   at least an optical fiber enclosed in a cable and having a first end and a second end;
   a pair of temples, at least one temple integrated with or coupled to the first end of the optical fiber, wherein the optical fiber is extended beyond the temple to receive an optical image at the second end thereof, wherein the optical image is generated in a portable device remotely located with respect to the display apparatus, the optical fiber transports the optical image from the second end to the first end thereof by total reflection within the optical fiber, the optical image is projected onto the second end of the optical fiber by a lens from a displayed image on a microdisplay device enclosed in the portable device;
   a projection mechanism, disposed near an end of the temple, receiving the optical image from the first end of the optical fiber and projecting the optical image into the lens; and
   a sensor and an infrared lighting source disposed separately around the lens to image an eye looking at the optical image, wherein the eye is illuminated by the infrared lighting source.

13. The display apparatus as recited in claim 12, wherein the optical image is a collection of lights in varying intensities collected by the lens from the displayed image, the lights all travel through the optical fiber simultaneously.

14. The display apparatus as recited in claim 13, wherein the projection mechanism includes: a focal mechanism auto-focusing and projecting the optical image onto the first edge of the prism.

15. The display apparatus as recited in claim 14, further comprising a wireless module provided to transmit wirelessly a sensing signal from the sensor to the portable device including a processor and circuitry to process the sensing signal and send a feedback signal to control the focal mechanism.

16. The display apparatus as recited in claim 15, wherein the focal mechanism includes a set of variable focus elements, at least one of the variable focus elements is adjustable to focus the optical image from the optical fiber onto the first edge of the prism.

17. The display apparatus as recited in claim 16, wherein the projection mechanism includes:
   an imaging medium converting the optical image from one spectrum band to another spectrum band; and
   a focal lens focusing and projecting the converted optical image onto the first edge of the prism.

18. The display apparatus as recited in claim 12, wherein the temple is presented as inflexible while a portion of the cable that is extended beyond the temple is flexible.

19. A display apparatus comprising:

a first and a second integrated lens, each of the first and second lenses formed by integrating a prism and an optical correcting lens, wherein the optical correcting lens is provided to correct a refracted optical path coming out from the prism to allow a user to see through both of the integrated lenses without optical distortions;

at least an optical fiber enclosed in a cable, the optical fiber having a first end and a second end;

a pair of temples, each integrated with or coupled to the first end of the optical fiber, wherein the optical fiber is extended to receive first and second optical images at the second end thereof, the optical images are generated in a portable device remotely located with respect to the display apparatus, the optical fiber transports the optical images from the second end to the first end thereof by total reflection within the optical fiber, the optical images are respectively projected onto the second end of the optical fiber by a lens from a displayed image on a microdisplay device enclosed in the portable device; and a projection mechanism disposed between the first and second lenses to project respectively the first and second optical images into the first and second integrated lenses for left and right eyes of the user.

20. The display apparatus as recited in claim 19, wherein the projection mechanism includes a pair of focal lenses focusing and projecting the first and second optical images onto an edge of the prism in each of the first and second lenses.

\* \* \* \* \*